Patented Oct. 10, 1933

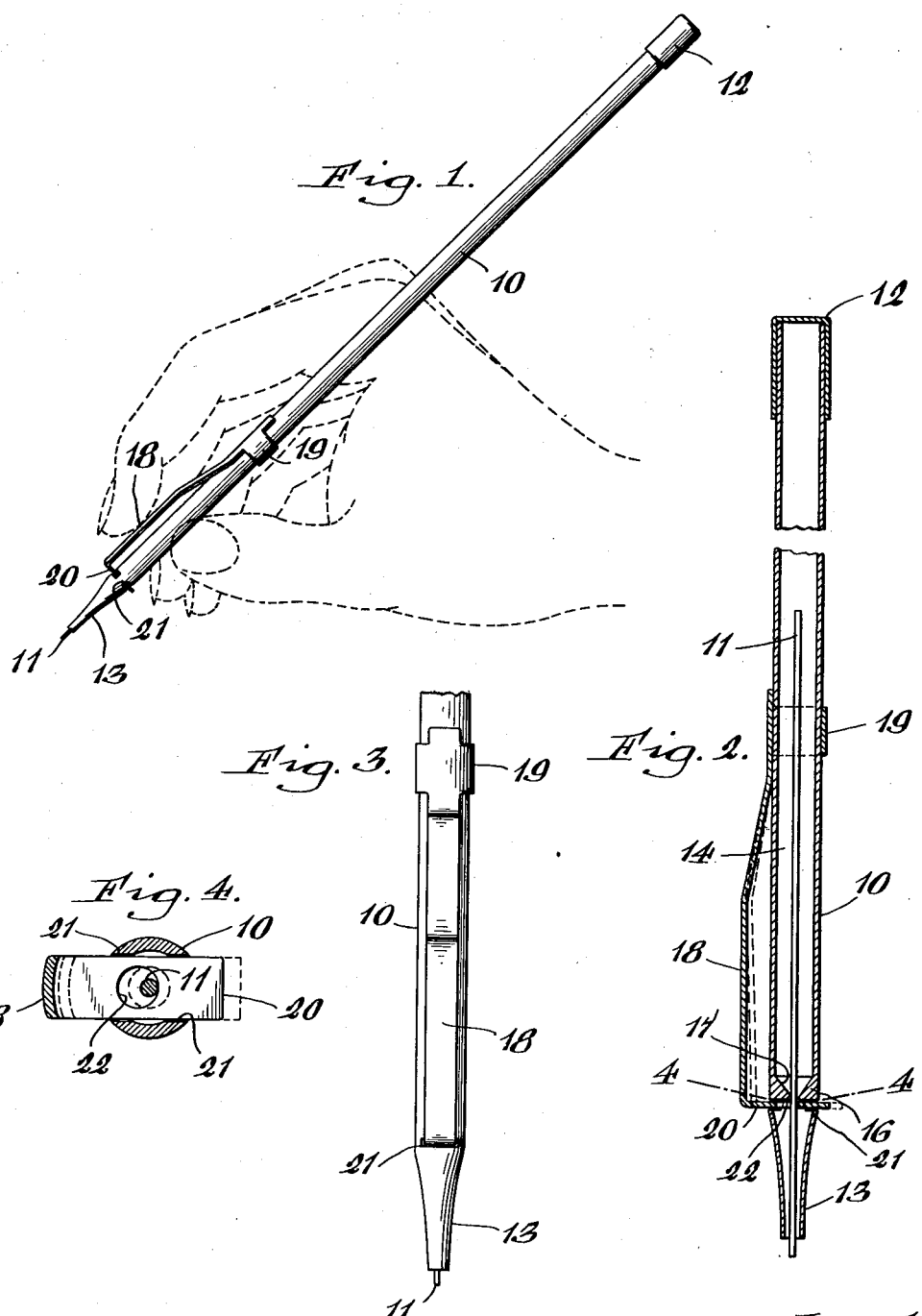

1,929,666

UNITED STATES PATENT OFFICE 1,929,666

SELF FEEDING SOLDER PENCIL

Reginald V. Williams, Buffalo, N. Y.

Application June 5, 1931. Serial No. 542,352

3 Claims. (Cl. 113—111)

This invention relates to a soldering pencil which is more particularly intended for use in the dental art, such as in the practice of orthodontia, although it is applicable for other uses where delicate soldering operations are desirable, as in the jewelry art.

One of the chief objects of the invention is the provision of a self-feeding soldering pencil, which is simple and inexpensive in construction, reliable and efficient in operation, and whose parts are so organized and arranged as to provide a well balanced tool for convenient use.

Another object of the invention is to provide a soldering pencil which is designed to facilitate the handling of the solder and the placing of the exact amount desired at the correct point of application.

A further object is to provide a self-feeding soldering pencil having simple and easily controlled means for effecting the feeding of the solder from the pencil, and also to employ in connection therewith a magazine for assuming the maintainance of the solder rods or pencils in straight lengths.

In the accompanying drawing:—

Figure 1 is a side elevation of my self-feeding soldering pencil, showing the manner of using the same. Figure 2 is an enlarged longitudinal section thereof. Figure 3 is a fragmentary front view of the pencil, showing the disposition of the feeder element thereof. Figure 4 is an enlarged cross section taken on line 4—4, Figure 2.

Similar characters of reference indicate corresponding parts throughout the several views.

This improved self-feeding soldering pencil has been designed particularly for the delicate soldering operations which are required in the dental, jewelry, and like arts, and to that end it consists generally of a pencil-like tool including a magazine or barrel for receiving one or more lengths of solder, and a feed element for effecting the projection of the solder from the pencil by a gentle downward thrust.

In the preferred embodiment of the invention shown in the drawing, the same consists of a comparatively long barrel or tubular magazine 10 constructed of metal or other appropriate material, the same being adapted to receive a charge or supply of one or more solder rods or wires 11. These soldering wires are admitted to the magazine through its open upper end, which may be closed by a suitable cap 12. The lower end of the magazine terminates in a substantially conical discharge mouth 13 from which the solder wires are adapted to be projected for use.

The magazine compartment 14 of the pencil is separated from the discharge mouth 13 by a partition 16 having an axially-arranged conical opening 17 therein for freely guiding a single soldering wire into the discharge mouth, as seen in Figure 2.

The self-feeding of the soldering wire from the pencil preferably is accomplished through the medium of a feeder element or clip applied to the lower portion of the magazine 10 and consisting of a shank 18 disposed lengthwise of the pencil and provided at its upper end with an attaching clamp or collar 19 and terminating at its lower end in a laterally and inwardly bent jaw or lip 20 which is adapted to extend across the magazine below its partition 16 and cooperate with the latter to normally hold or resist the discharge of the solder wire from the magazine. The feeder element is made of spring steel or like material and its shank is spaced from the wall of the magazine to provide sufficient room for the movement of the jaw 20 into and out of a released position, the shank being normally distended from the magazine with the jaw in gripping position with the solder wire, as shown by full lines in Figures 2 and 4, to prevent its displacement from the magazine. As seen in these figures, the jaw 20 extends transversely across the magazine below and in overlying relation to its partition 16 and for this purpose the magazine is provided in its diametrically opposite sides with transversely alined slots or openings 21 for the passage and guidance of the jaw. The latter has an opening 22 therein of somewhat larger diameter than the partition-opening 17, one edge of this opening constituting a gripping edge in the normal distended position of the spring clip to positively clamp the soldering wire between such edge and the opposing edge of the partition-opening, as shown by full lines in Figure 2. When the clip is depressed toward the magazine by the index finger to the position shown by dotted lines in Figures 2 and 4, the jaw-opening 22 will be released from contact with the soldering wire and upon shaking the pencil with a slight downward thrust, the wire will be fed in a progressive fashion from the discharge mouth 13. When the desired length of solder has been thus fed through the discharge mouth, it is firmly held in position by the jaw 20 upon releasing the pressure of the index finger from the spring clip.

This improved soldering pencil, while manifestly simple, compact and inexpensive in construction, effectually permits delicate soldering operations in a convenient and simple manner. Furthermore, the pencil is designed with a supply of solder wire sufficient for use over a long period of time and during which time the wire is protected and maintained in the straight lengths required for use. In addition to these advantages, the action of the pencil is fool proof and it facilitates the handling of the solder and the placing of the exact amount desired at the proper point on the appliance.

I claim as my invention:—

1. A soldering tool, comprising a pencil-like barrel adapted to receive one or more solder wires and having a discharge mouth at its lower end and an alining feed passage for a solder wire spaced above said discharge mouth, said barrel having alining slots in its diametrically opposite sides between the discharge mouth and the feed passage, and a releasable element applied to said barrel and including a transversely-disposed jaw intersecting said slots and having an opening therein for the passage of the solder wire, the opposing edges of said feed passage and said jaw-opening serving to normally grip the wire.

2. A soldering tool, comprising a pencil-like barrel adapted to receive one or more solder wires and having a discharge mouth at its lower end and a transverse partition spaced above said discharge mouth and containing a substantially axially disposed feed passage, said barrel having a slot in its side below said partition, and a yieldable feeder element for normally gripping the solder wire against projection from the barrel-mouth, said element including a releasable finger-engaging portion extending generally lengthwise of the barrel and carrying a transversely-arranged jaw guided in said barrel-slot and having an opening therein for the passage of the solder wire, the opposing edges of said feed passage and said jaw-opening serving to normally grip the wire.

3. A soldering tool of the character described, comprising a pencil-like barrel having a partition adjacent its lower end dividing the barrel into a magazine compartment for receiving a plurality of solder wires and a discharge section for the passage of a single solder wire, said partition having a feed passage disposed axially in line with said discharge passage section, and finger-engaging means applied to said barrel for releasably holding the wire therein, said means consisting of a shank yieldable bodily toward and from the barrel and terminating at one end in an attaching portion for securing it to the barrel and at its opposite end in a jaw intersecting and movable transversely of the barrel for releasable gripping engagement with the wire in the discharge section thereof, the yieldable shank normally urging the jaw in a direction to seek a gripping position.

REGINALD V. WILLIAMS.